United States Patent
Kwon et al.

(10) Patent No.: US 8,941,613 B2
(45) Date of Patent: Jan. 27, 2015

(54) TOUCH SENSING APPARATUS AND METHOD THEREOF

(75) Inventors: Yong Il Kwon, Suwon (KR); Hyun Suk Lee, Suwon (KR); Tah Joon Park, Suwon (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 173 days.

(21) Appl. No.: 13/532,088

(22) Filed: Jun. 25, 2012

(65) Prior Publication Data
US 2013/0257789 A1    Oct. 3, 2013

(30) Foreign Application Priority Data
Mar. 30, 2012    (KR) .................... 10-2012-0032872

(51) Int. Cl.
*G06F 3/045* (2006.01)
*G06F 3/041* (2006.01)
*G06F 3/044* (2006.01)

(52) U.S. Cl.
USPC .................... 345/174; 345/173; 178/18.06

(58) Field of Classification Search
CPC ..... H03K 17/962; H03K 17/955; G01D 5/24; G06F 3/03547; G06F 3/0488; G06F 2203/04105; G06F 2203/04107; G06F 3/044; G06F 3/041; G06F 3/04883; G06F 3/0412
USPC ................................. 345/174, 173
See application file for complete search history.

(56) References Cited

U.S. PATENT DOCUMENTS

| | | | |
|---|---|---|---|
| 7,030,860 B1 | 4/2006 | Hsu et al. | |
| 2009/0115737 A1 | 5/2009 | Toyoshima | |
| 2010/0060610 A1* | 3/2010 | Wu | 345/174 |
| 2010/0097015 A1* | 4/2010 | Knoedgen et al. | 318/135 |
| 2010/0117986 A1* | 5/2010 | Yang | 345/174 |
| 2011/0115729 A1 | 5/2011 | Kremin et al. | |
| 2012/0001859 A1* | 1/2012 | Kim et al. | 345/173 |
| 2013/0106779 A1* | 5/2013 | Company Bosch et al. | 345/174 |

FOREIGN PATENT DOCUMENTS

| | | |
|---|---|---|
| JP | 2009-116489 | 5/2009 |
| KR | 10-2011-0076051 A | 7/2011 |

* cited by examiner

*Primary Examiner* — Aneeta Yodichkas
(74) *Attorney, Agent, or Firm* — McDermott Will & Emery LLP

(57) ABSTRACT

There are provided a touch sensing apparatus and method. The touch sensing apparatus includes a sensing circuit unit detecting a plurality of signals from a plurality of changes in capacitance generated in a plurality of electrodes provided in a panel unit; and a signal processing unit comparing, with predetermined reference levels, levels of at least two signals generated from changes in capacitance in at least two electrodes spaced apart from one another by a predetermined distance or greater, from among the plurality of electrodes, wherein, when the levels of the at least two signals are greater than the predetermined reference levels, the plurality of changes in capacitance are determined to be generated due to noise.

15 Claims, 6 Drawing Sheets

TOUCH SENSING APPARATUS AND METHOD THEREOF

CROSS-REFERENCE TO RELATED APPLICATIONS

This application claims the priority of Korean Patent Application No. 10-2012-0032872 filed on Mar. 30, 2012, in the Korean Intellectual Property Office, the disclosure of which is incorporated herein by reference.

BACKGROUND OF THE INVENTION

1. Field of the Invention

The present invention relates to a touch sensing apparatus and a method thereof, allowing for a significant reduction in the influence of noise without utilizing complex algorithm and signal processing by detecting the presence or absense of noise by using signals detected from at least two electrodes spaced apart from one another in a panel unit.

2. Description of the Related Art

A touch sensing apparatus such as a touch screen, a touch pad, or the like, an input apparatus attached to a display apparatus to provide an intuitive input method to a user, has recently been widely used in various electronic devices such as portable phones, personal digital assistants (PDAs), navigation apparatuses, and the like. In particular, recently, with an increase in demand for smart phones, the rate at which touch screens have been adopted as touch sensing apparatus capable of providing various input methods in a limited form factor has increased on a day by day basis.

Touch screens used in portable devices may be divided into resistive type touch screens and capacitive type touch screens, according to a method of sensing a touch. The capacitive type touch screen has advantages in that it has a relatively long lifespan and various input methods and gestures may be easily implemented therein, such that use thereof has markedly increased. Particularly, a multi-touch interface may be more easily implemented using the capacitive type touch screen, as compared to the resistive type touch screen, such that it is widely used in devices such as smart phones, and the like.

The touch screen is generally attached to a front surface of the display device and touch sensing devices other than the touch screen are also generally provided in the electronic apparatus. Accordingly, accuracy in sensing a touch may be deteriorated due to noise generated from various other electronic components, e.g., a wireless communications unit, the display device and a power supply device, included in the electronic apparatus. An additional shielding layer may be provided between the display device and the touch screen in order to solve the problem, but in this case, overall light transmittance may be deteriorated and product thickness may be increased.

In Patent Document 1, relating to a capacitive type touch screen panel, a method of directly controlling a touch driving time by using a display apparatus timing signal has been disclosed. In addition, in Patent Document 2, relating to a capacitive type touch screen panel, a method of adjusting a settling period so as to reduce the influence of noise in sensing a touch has been disclosed.

RELATED ART DOCUMENT

Patent Document 1: Korean Patent Laid-Open Publication No. 10-2011-0076051

Patent Document 2: Japanese Patent Laid-Open Publication No. 2009-116489

SUMMARY OF THE INVENTION

An aspect of the present invention provides a touch sensing apparatus and method, able to easily detect noise that may affect a touch screen apparatus. Here, signals detected in electrodes spaced apart from one another by a predetermined distance or greater, from among a plurality of electrodes provided in a panel unit, may be selected, and levels of the selected signals may be compared with predetermined reference levels, and then whether or not noise is generated may be determined based on the comparison result. As a result, the influence of noise may be reduced without utilizing an additional shielding layer or a complex circuit and algorithm.

According to an aspect of the present invention, there is provided a touch sensing apparatus, including: a sensing circuit unit detecting a plurality of signals from a plurality of changes in capacitance generated in a plurality of electrodes provided in a panel unit; and a signal processing unit comparing, with predetermined reference levels, levels of at least two signals generated from changes in capacitance in at least two electrodes spaced apart from one another by a predetermined distance or greater, from among the plurality of electrodes, wherein, when the levels of the at least two signals are greater than the predetermined reference levels, the plurality of changes in capacitance are determined to be generated due to noise.

The sensing circuit unit may include a plurality of capacitance sensing circuits integrating the plurality of changes in capacitance to generate the plurality of signals.

The touch sensing apparatus may further include a controlling unit adjusting a timing at which the capacitance sensing circuits initiate integration of the plurality of changes in capacitance when the plurality of changes in capacitance are determined to be generated due to the noise.

The controlling unit may cause the integration of the capacitance sensing circuits to be stopped for a predetermined period of time when the plurality of changes in capacitance are determined to be generated due to the noise.

The controlling unit may cause the capacitance sensing circuits to be operated in synchronization with a driving timing at which a driving signal is applied to at least a portion of the plurality of electrodes when the predetermined period of time has elapsed.

The signal processing unit may include at least two comparing circuits comparing the levels of the at least two signals with the predetermined reference levels; and a calculating unit determining whether the plurality of changes in capacitance are generated due to the noise using a comparison result of the at least two comparing circuits.

The calculating unit may include at least one logic circuit.

The at least two electrodes may include two electrodes, from among the plurality of electrodes provided in the panel unit, spaced apart from one another by a maximal distance.

According to another aspect of the present invention, there is provided a touch sensing method, including: selecting at least two signals detected from at least two electrodes spaced apart from one another by a predetermined distance or greater, from among a plurality of signals detected from a plurality of electrodes; comparing levels of the at least two signals with a predetermined reference level; and determining that the plurality of signals are generated due to noise, when the levels of the at least two signals are greater than the predetermined reference level.

The touch sensing method may further include integrating changes in capacitance generated in the plurality of electrodes to generate the plurality of signals.

The touch sensing method may further include stopping generating the plurality of signals for a predetermined period of time when the plurality of signals are determined to be generated due to the noise.

The touch sensing method may further include restarting the integrating of the changes in capacitance generated in the plurality of electrodes in synchronization with a driving timing at which a driving signal is applied to at least a portion of the plurality of electrodes, when the predetermined period of time has elapsed.

The selecting of the at least two signals may be performed on the at least two electrodes including two electrodes, from among the plurality of electrodes, spaced apart from one another by a maximal distance.

The predetermined reference level may include a plurality of reference levels having different signs.

The levels of the at least two signals may be compared with the plurality of reference levels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
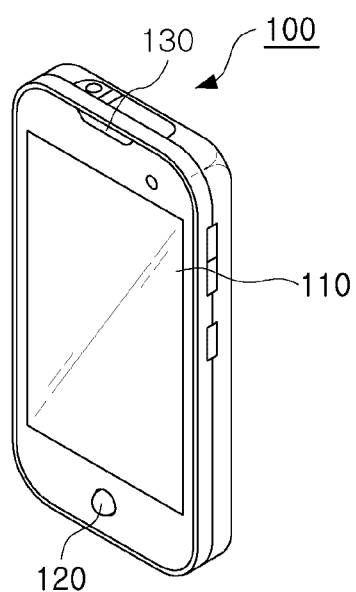
FIG. 1 is a perspective view illustrating an exterior of an electronic apparatus including a touch sensing apparatus according to an embodiment of the present invention.

Embodiments of the present invention will be described in detail with reference to the accompanying drawings. These embodiments will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, the detailed description provided below should not be construed as being restrictive. In addition, the scope of the present invention is defined only by the accompanying claims and their equivalents if appropriate. Similar reference numerals will be used to describe elements having the same or similar functions throughout the accompanying drawings.

Hereinafter, embodiments of the present invention will be described in detail with reference to the accompanying drawings so that those skilled in the art may easily practice the present invention.

FIG. 1 is a perspective view illustrating an exterior of an electronic apparatus including a touch sensing apparatus according to an embodiment of the present invention. Referring to FIG. 1, an electronic apparatus 100 according to the embodiment of the present invention may include a display device 110 for outputting an image, an input unit 120, and an audio unit 130 for outputting sound, and may also include a touch sensing apparatus integrated with the display device 110.

As shown in FIG. 1, in the case of a mobile apparatus, the touch sensing apparatus is generally provided integrally with the display device, and needs to have high light transmissivity enough to transmit the image displayed by the display apparatus. Therefore, the touch sensing apparatus may be implemented by forming a sensing electrode using a transparent and electrically conductive material such as indium tin oxide (ITO), indium zinc oxide (IZO), zinc oxide (ZnO), carbon nano tube (CNT), or graphene on a base substrate formed of a transparent film material such as polyethylene telephtalate (PET), polycarbonate (PC), polyethersulfone (PES), polyimide (PI), or the like. The display apparatus may include a wiring pattern disposed in a bezel area 115 thereof, wherein the wiring pattern is connected to the sensing electrode formed of the transparent conductive material. Since the wiring pattern is visually shielded by the bezel area 115, it may be formed of a metal material such as silver (Ag), copper (Cu), or the like.

In a case in which the touch sensing apparatus according to the embodiment of the present invention needs not to be provided integrally with the display apparatus as in a touch pad of a notebook computer, or the like, the touch sensing apparatus may also be manufactured by simply patterning the sensing electrodes using a metal on a circuit board. However, for convenience of explanation, the touch sensing apparatus and method according to the embodiment of the present invention will be described based on the touch screen.

Figure 2:
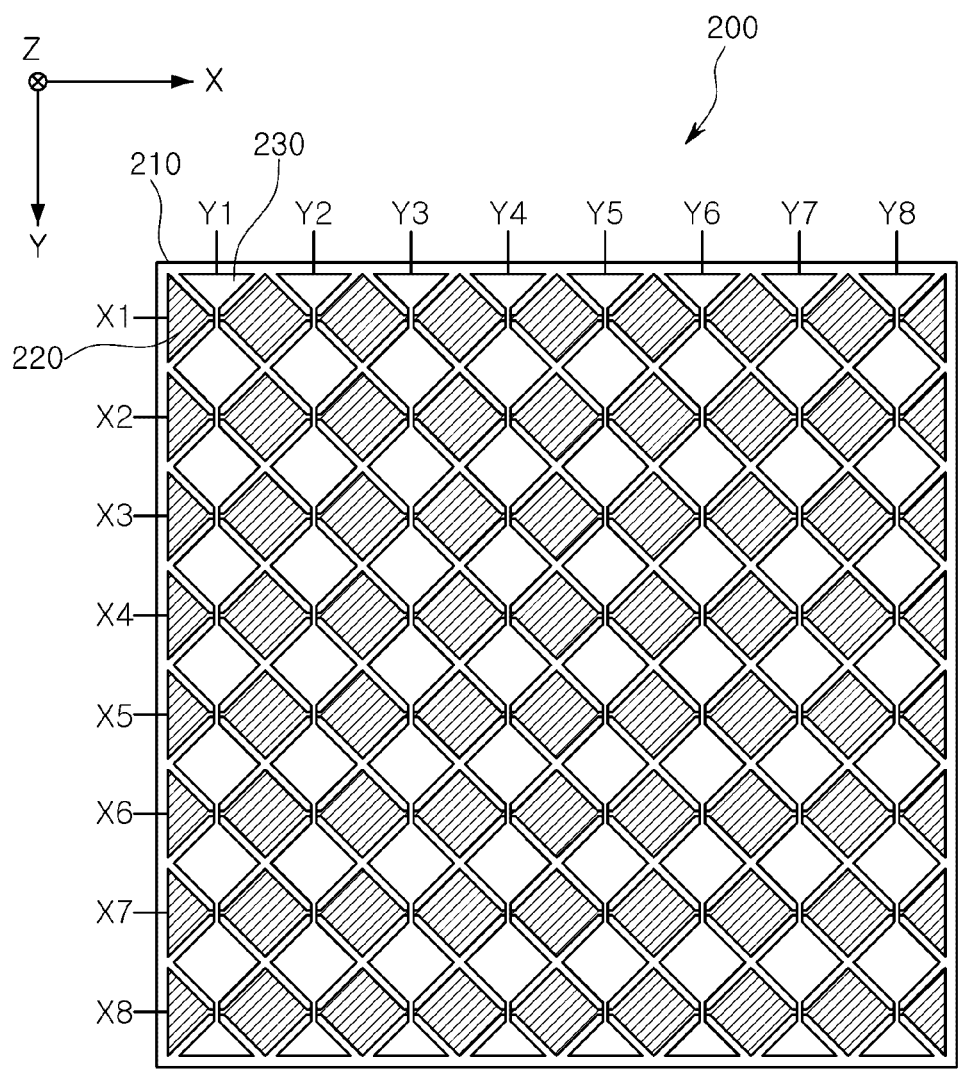
FIG. 2 is a plan view illustrating a panel unit electrically connected to a touch sensing apparatus according to an embodiment of the present invention.

FIG. 2 is a plan view illustrating a panel unit electrically connected to a touch sensing apparatus, according to an embodiment of the present invention.

Referring to FIG. 2, a touch screen panel 200 according to the present embodiment includes a substrate 210, and a plurality of sensing electrodes 220 and 230 provided on the substrate 210. Although not shown in FIG. 2, each of the plurality of sensing electrodes 220 and 230 may be electrically connected to the wiring pattern of the circuit board attached to an end of the substrate 210 through a wire and a bonding pad. A controller integrated circuit is mounted on the circuit board to detect signals generated from the plurality of sensing electrodes 220 and 230 and judge a touch based thereon.

In the touch screen, the substrate 210 may be a transparent substrate in which the sensing electrodes 220 and 230 can be formed and may be formed of a plastic material such as polyimide (PI), polymethylmethacrylate (PMMA), polyethyleneterephthalate (PET), or polycarbonate (PC) or tempered glass. Further, apart from an area in which the sensing electrodes 220 and 230 are formed, a predetermined printing area for the wire connected with the sensing electrodes 220 and 230 may be formed on the substrate 210 in order to visually shield the wire formed of an opaque metallic material.

The plurality of sensing electrodes 220 and 230 may be provided on one surface or both surfaces of the substrate 210. In the case of the touch screen, the plurality of sensing electrodes 220 and 230 may be formed of a transparent conductive material such as indium-tin oxide (ITO), indium zinc-oxide (IZO), zinc oxide (ZnO), carbon nano tube (CNT), or a graphene based material. Although the sensing electrodes 220 and 230 have a rhombus, or diamond-shaped, pattern as shown in FIG. 2, the sensing electrodes 220 and 230 may have various patterns using polygonal shapes such as a rectangle, a triangle, and the like.

The plurality of sensing electrodes 220 and 230 include first electrodes 220 extending in an X-axis direction and second electrodes 230 extending in a Y-axis direction. The first and second electrodes 220 and 230 may be provided on both surfaces of the substrate 210 or provided on different substrates to intersect each other. In the case in which both the first and second electrodes 220 and 230 are provided on one surface of the substrate 210, a predetermined insulating layer may be partially formed at an intersecting point between the first and second electrodes 220 and 230.

A touch sensing apparatus that is electrically connected with the plurality of sensing electrodes 220 and 230 to sense a touch detects capacitance variations sensed in the plurality of sensing electrodes 220 and 230 and senses the touch therefrom. The first electrodes 220 are connected to channels defined as D1 to D8 in the controller integrated circuit to receive predetermined driving signals, and the second electrodes 230 are connected to channels defined as S1 to S8 to be used in order for the controller integrated circuit to detect sensed signals. In this case, the controller integrated circuit may detect mutual-capacitance variations generated between the first and second electrodes 220 and 230 as the sensed signals, and may sequentially apply the driving signals to the individual first electrodes 220 and simultaneously detect capacitance variations from the second electrodes 230.

Figure 3:
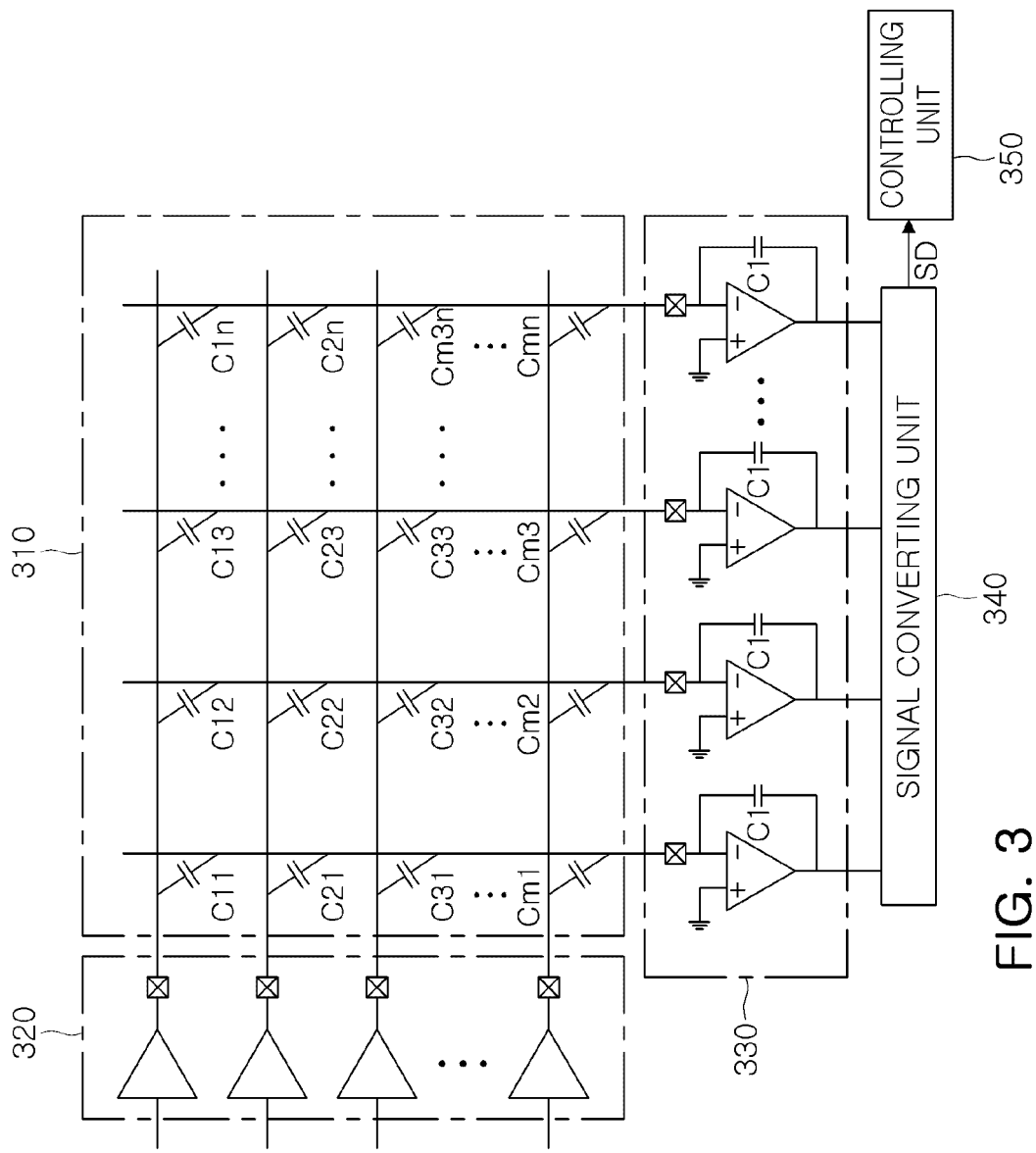
FIGS. 3 and 4 are views illustrating a touch sensing apparatus according to an embodiment of the present invention.
Figure 4:
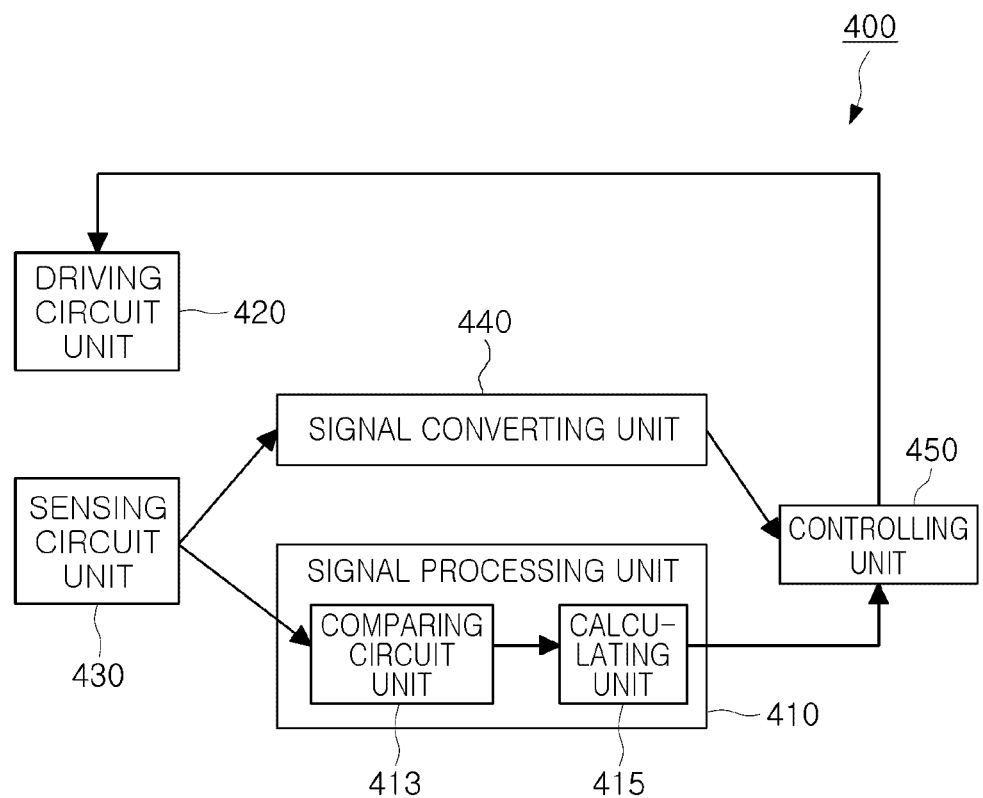

FIGS. 3 and 4 are views illustrating a touch sensing apparatus according to an embodiment of the present invention.

Referring to FIG. 3, the touch sensing apparatus according to the embodiment of the present invention includes a panel unit 310, a driving circuit unit 320, a sensing circuit unit 330, a signal converting unit 340, and a controlling unit 350.

The panel unit 310 includes a plurality of first electrodes extended in a first axial direction (in a horizontal direction of FIG. 3), and a plurality of second electrodes extended in a second axial direction (in a vertical direction of FIG. 3) intersecting with a first axis, and changes in mutual capacitance C11 to Cmn are generated at intersections of the first and second electrodes. The changes in mutual capacitance C11 to Cmn generated at the intersections of the first and second electrodes may be generated by a driving signal applied to the first electrodes by the driving circuit unit 320. Meanwhile, the driving circuit unit 320, the sensing circuit unit 330, the signal converting unit 340, and the controlling unit 350 may be implemented as a single integrated circuit (IC).

The driving circuit unit 320 applies a predetermined driving signal to the first electrodes of the panel unit 310. The driving signal may be a square wave signal, a sine wave signal, a triangle wave signal, or the like, which has a predetermined cycle and amplitude. The driving signal may be sequentially applied to each of the plurality of first electrodes. In FIG. 3, circuits for generating and applying a driving signal are individually connected to the plurality of first electrodes; however, a single circuit for generating a driving signal may be provided and the driving signal may be applied to each of the plurality of first electrodes using a switching circuit.

The sensing circuit unit 330 may include an integration circuit detecting changes in capacitance C11 to Cmn from the second electrodes. The integration circuit may include at least one operational amplifier and at least one capacitor C1 having a predetermined capacity, and an inverting input terminal of the operational amplifier may be connected to the second electrodes to thereby convert the changes in capacitance C11 to Cmn into an analog signal such as a voltage signal or the like to be output. When the driving signal is sequentially applied to each of the plurality of first electrodes, the changes in capacitance may be simultaneously detected from the plurality of second electrodes, and therefore, m-number of integration circuits may be provided. Here, m is the number of the second electrodes.

The signal converting unit 340 generates a digital signal $S_D$ from the analog signal generated by the integration circuit. For example, the signal converting unit 340 may include a time-to-digital converter (TDC) circuit measuring a time required for the voltage type analog signal output from the sensing circuit unit 330 to reach a predetermined reference voltage level and converting the measured time into the digital signal $S_D$, or an analog-to-digital converter (ADC) circuit measuring an amount by which a level of the analog signal output from the sensing circuit unit 330 is changed over a predetermined period of time and converting the measured amount into the digital signal $S_D$. The controlling unit 350 determines a touch applied to the panel unit 310 using the digital signal $S_D$. As an example, the controlling unit 350 may determine the number of touches applied to the panel unit 310, coordinates of the touches, movements during the touches, and the like.

The panel unit 310 is attached to a front surface of a display device of an electronic apparatus such as a smart phone, a tablet PC, a laptop, or the like, and therefore, noise generated in the display device may be introduced into the panel unit 310. In particular, in a case of a mobile apparatus in which a variety of modules such as an RF module, an antenna, a power supply device, and the like are integrated in a small form factor, a variety of electrical noise, generated in modules other than the display device may be introduced into the panel unit 310. Noise introduced into the panel unit 310 may affect processes performed in the sensing circuit unit 330, the signal converting unit 340, the controlling unit 350, and the like, and reduce accuracy in a signal-to-noise ratio (SNR), coordinate determination, touch movement determination, and the like.

To prevent performance degradation due to electrical noise, at least one of the sensing circuit unit 330, the signal processing unit 340, and the controlling unit 350 may include a circuit, an algorithm, or the like for removing or correcting the influence of electrical noise. However, a circuit or an algorithm for mitigating the influence of electrical noise may be generally implemented in a digital circuit that processes the digital signal $S_D$ output from the signal converting unit 340, and this may increase an overall cost of the touch sensing apparatus and add complexity to a circuit configuration.

In order to overcome this problem, a method of detecting noise introduced into the panel unit 310 using a simple circuit structure to thereby improve an SNR and accuracy in coordinate determination and touch movement determination is proposed in an embodiment of the present invention. Hereinafter, an embodiment of the present invention will be described with reference to FIG. 4.

FIG. 4 is a view illustrating a touch sensing apparatus according to an embodiment of the present invention. Referring to a block diagram of FIG. 4, a touch sensing apparatus 400 according to the present embodiment may include a signal processing unit 410, a driving circuit unit 420, a sensing circuit unit 430, a signal converting unit 440, a controlling unit 450, and the like. The driving circuit unit 420 may include at least one driving circuit for applying a predetermined driving signal, and the sensing circuit unit 430 may generate a plurality of signals from changes in capacitance generated in a plurality of sensing electrodes. The sensing circuit unit 430 may include a capacitance sensing circuit having an integrator.

The driving circuit unit 420 may sequentially apply the predetermined driving signal to the plurality of sensing electrodes provided in the panel unit. When the driving signal is applied to the sensing electrodes, the sensing circuit unit 430 detects changes in capacitance from electrodes intersecting the electrodes to which the driving signal is applied. The integrator included in the sensing circuit unit 430 generates a signal such as a voltage signal, a current signal, or the like by integrating a change in capacitance, and the generated signal is transmitted to the signal converting unit 440. As described in FIG. 3, the signal converting unit 440 converts the signal into a digital signal, and the controlling unit 450 processes the digital signal to determine the coordinates, movements, and the like of the touch.

Meanwhile, the touch sensing apparatus 400 according to the present embodiment may include the signal processing unit 410 determining whether noise is generated, using the plurality of signals generated by the sensing circuit unit 430. The signal processing unit 410 selects at least a portion of the plurality of signals, and compares a level of each of the selected signals with a predetermined reference level. To enable this, the signal processing unit 410 may include at least one comparing circuit unit 413.

In the signal processing unit 410, an output of the comparing circuit unit 413 is transmitted to a calculating unit 415. The calculating unit 415 may include a logic circuit determining whether noise is generated based on the output of the comparing circuit unit 413.

When the calculating unit 415 determines whether or not noise is generated, the determined result is transmitted to the controlling unit 450. The controlling unit 450 may control operations of the driving circuit unit 420, the sensing circuit unit 430, and the signal converting unit 440 using information concerning whether noise is generated, determined by the calculating unit 415. Hereinafter, operations of the signal processing unit 410 will be described with reference to FIG. 5.

Figure 5:
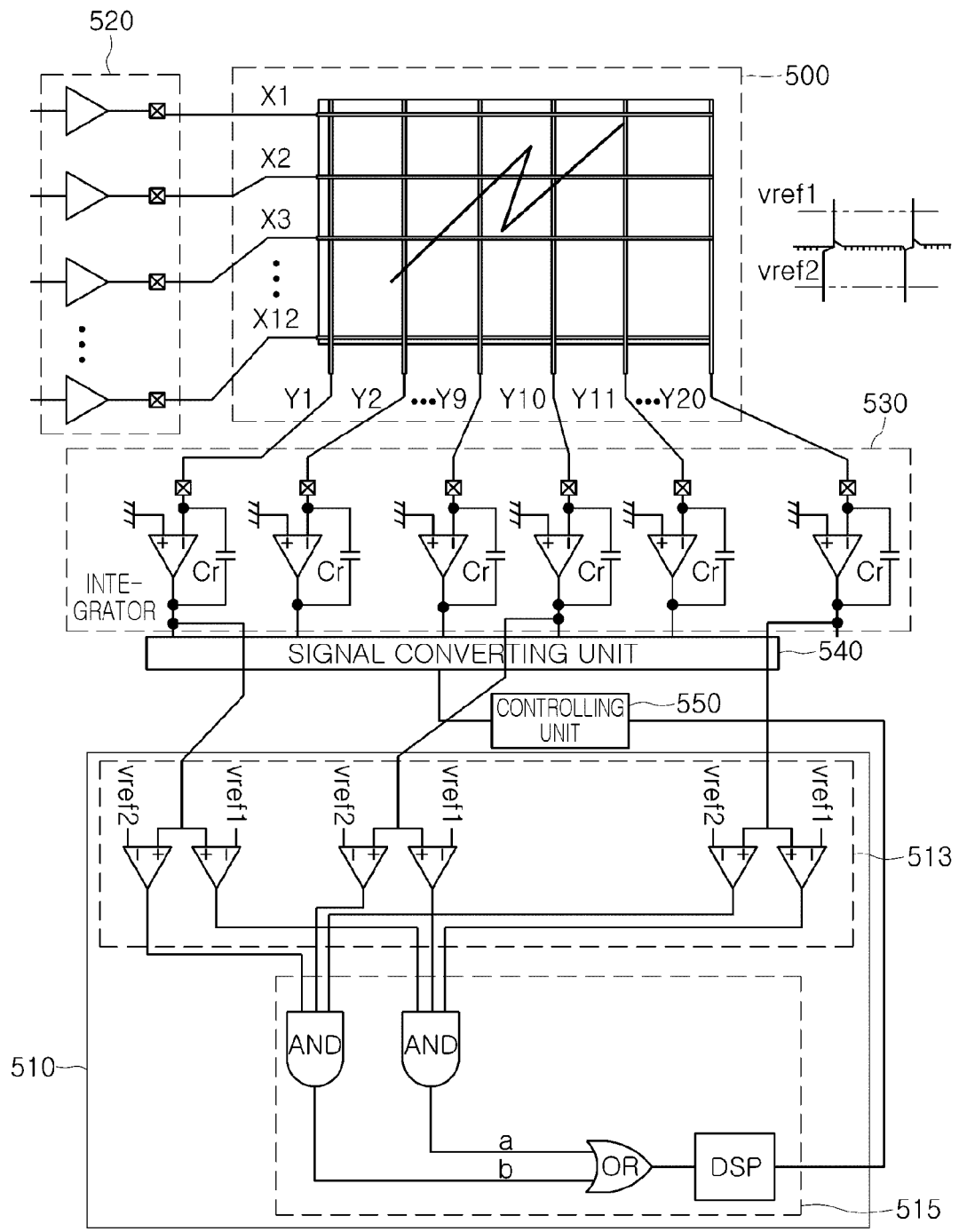
FIG. 5 is a view explaining a method of operating a touch sensing apparatus according to an embodiment of the present invention.

FIG. 5 is a view explaining a method of operating a touch sensing apparatus according to an embodiment of the present invention.

Referring to FIG. 5, a panel unit 500 includes a plurality of first electrodes X1 to X12 extended in a horizontal direction, and a plurality of second electrodes Y1 to Y20 extended in a vertical direction. An array form of the plurality of first and second electrodes shown in FIG. 5 is merely an example, and the present invention is not limited thereto. The plurality of first electrodes X1 to X12 are connected to a driving circuit unit 520 to thereby sequentially receive a predetermined driving signal.

The plurality of second electrodes Y1 to Y20 are connected to a sensing circuit unit 530. The sensing circuit unit 530 may include a capacitance sensing circuit generating a signal such as a voltage signal, a current signal, or the like by integrating a change in capacitance. As an example, the sensing circuit unit 530 may detect change in mutual capacitance from the second electrodes Y1 to Y20 intersecting the first electrodes X1 to X12 receiving the driving signal from the driving circuit unit 520. The signal generated from the change in capacitance by the sensing circuit unit 530 is converted into a digital signal in a signal converting unit 540, and the converted digital signal is transmitted to a controlling unit 550. The controlling unit 550 determines coordinates, movements, and the like of a touch based on the digital signal.

Meanwhile, a signal processing unit 510 selects at least a portion of a plurality of signals generated from the plurality of second electrodes Y1 to Y20 by the sensing circuit unit 530, and compares levels of the selected signals with predetermined reference levels Vref1 and Vref2. Accordingly, the signal processing unit 510 may include at least one comparing circuit 513, implemented as an operational amplifier (Op-Amp) or the like, as shown in FIG. 5. The reference levels Vref1 and Vref2 compared with the levels of the signals by the comparing circuit may include a first reference value Vref1 and a second reference value Vref2 in order to detect the level of the signal being an impulse signal having a positive (+) sign due to noise introduced into the panel unit 500, and the level of the signal being an impulse signal having a negative (−) sign.

In the present embodiment, it is assumed that three signals, output from the capacitance sensing circuit connected to the second electrodes Y1 and Y20 provided in the leftmost and the rightmost of the panel unit 500 and the second electrode Y10 provided in the middle of the panel unit 500, are selected. This is based on characteristics in which the signals are evenly generated over the entire area of the panel unit 500 due to noise introduced from the display device, and the like, whereas the signals are only generated in a certain area of the panel unit 500 due to an effective touch applied by a user.

The second electrodes Y1 to Y20 from which the signals are to be selected are not limited to the case of FIG. 5, and other modified embodiments may be made as long as the detection of the signals generated over the entirety of the panel unit 500 due to the influence of noise can be performed. However, in order to detect the signals generated due to noise over the entirety of the panel unit 500, second electrodes spaced apart from one another by a predetermined distance or greater, from among the second electrodes Y1 to Y20 may be selected. As another example, signals may be detected from the second electrodes Y4, Y8, Y12, Y16, and Y20 among the second electrodes Y1 to Y20, and the detected signals may be compared with the reference levels Vref1 and Vref2 to thereby determine the presence or absence of noise.

Results of comparing levels of the three selected signals with the first and second reference levels Vref1 and Vref2 are transmitted to the logic circuit included in the calculating unit 515. Referring to FIG. 5, results of comparing the first reference level Vref1 with the levels of the three selected signals and results of comparing the second reference value Vref2 with the levels of the three selected signals are input to first and second AND gates 516 and 517, respectively. As known in the art, the AND gates 516 and 517 output high level signals when all input signals have high levels. Accordingly, when the levels of the three selected signals are greater than the first reference level Vref1, a high level output signal is output from the first AND gate 516. Similarly, when the levels of the three selected signals are greater than the second reference level Vref2, a high level output signal is output from the second AND gate 517.

The output signals of the respective AND gates 516 and 517 are transmitted to an OR gate 518. The OR gate 518 outputs a high level signal when at least one of the input signals has a high level. Accordingly, when at least one of the output signals of the first and second AND gates 516 and 517 has a high level, the OR gate 518 outputs a high level signal. Consequently, when the output signal of the OR gate 518 has a high level, the controlling unit 550 may determine that electrical noise affects the panel unit 500 based on an output from a Digital Signal Processing (DSP) circuit unit.

When the output signal of the OR gate 518 has the high level, the controlling unit 550 may determine that the signals detected by the sensing circuit unit 530 are generated from the change in capacitance generated due to electrical noise. Accordingly, the operation of the sensing circuit unit 530 may be suspended for a predetermined period of time. As an example, by suspending the integrating operation of the capacitance sensing circuit included in the sensing circuit unit 530 for a predetermined period of time, the detection of the changes in capacitance occurred due to noise as the signals may be prevented.

When a starting timing of the predetermined period of time at which the operation of the sensing circuit unit 530 is stopped is included during the integrating operation of the capacitance sensing circuit, errors may occur in the overall operation of the touch sensing apparatus. To avoid this, a timing of stopping the operation of the sensing circuit unit 530 and a timing of re-starting the operation thereof after a predetermined period of time has elapsed may be synchronized with a timing of applying a driving signal by the driving circuit unit 520.

Figure 6:
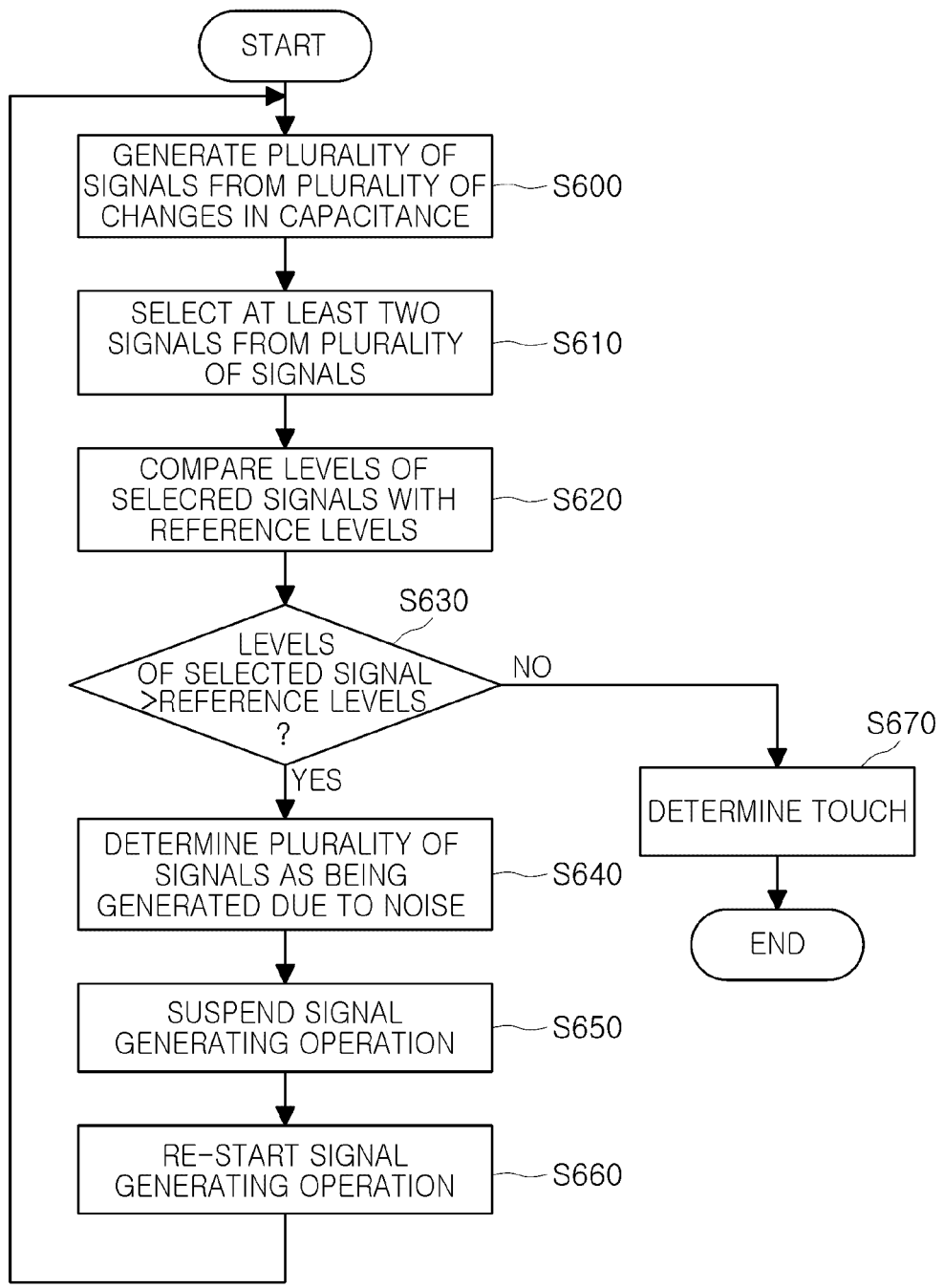
FIG. 6 is a flowchart illustrating a touch sensing method according to an embodiment of the present invention.

FIG. 6 is a flowchart illustrating a touch sensing method according to an embodiment of the present invention.

Referring to FIG. 6, the touch sensing method according to the present embodiment starts from generating a plurality of signals from a plurality of changes in capacitance in S600. As described above, the signals may be generated from the changes in capacitance generated by a touch in the plurality of sensing electrodes provided in the panel unit 500. Here, the change in capacitance generated by the touch may be a change in mutual capacitance or a change in self-capacitance.

When the plurality of signals are generated, at least two signals may be selected from the plurality of generated signals in S610. The at least two selected signals may be used by the signal processing unit 510 in order to determine whether or not noise is generated. In this case, in order to accurately recognize the influence of noise present over the entirety of the panel unit 500 distinguished from an effective touch, the at least two signals may be selected from at least two sensing electrodes spaced apart from one another by a predetermined distance or greater. As described in FIG. 4, when it is assumed that the signals are generated by detecting the changes in capacitance from a total of twenty second electrodes Y1 to Y20, the second electrodes Y1 and Y20 arranged on the outermost portions of the panel unit and at least one of the second electrodes Y5 to Y15 arranged on the middle portion of the panel unit may be selected.

In S620, levels of the at least two selected signals are compared with predetermined reference levels. The levels of the at least two selected signals may be compared with a plurality of reference levels so as to detect positive (+) and negative (−) impulse signal errors in the signals due to noise affecting the panel unit 500. To compare the levels of the at least two selected signals with the reference levels, the signal processing unit 510 may include at least one comparing circuit 513.

When the levels of the at least two selected signals are greater than the reference values based on the comparison results of the comparing circuit 513 in S630, it is determined in S640 that the plurality of signals generated in S600 are generated due to noise introduced from the outside, rather than noise generated by the effective touch. Accordingly, the controlling unit 550 prevents the noise from affecting the determination of the touch by stopping the operations of the driving circuit unit 520 and the sensing circuit unit 530 for a predetermined period of time in S650. After the predetermined period of time has elapsed, the driving circuit unit 520 and the sensing circuit unit 530 re-start the operations thereof in S660. Here, the controlling unit 550 may control the touch sensing apparatus to be stably operated by synchronizing the operations of the driving circuit unit 520 and the sensing circuit unit 530 with one another.

Meanwhile, when any one of the levels of the at least two selected signals is less than the reference levels based on the comparison result of the comparing circuit 513 in S630, it is determined in S670 that the plurality of signals generated in S600 are generated by an effective touch. In the present embodiment, it is assumed that the plurality of signals are determined to be generated by the effective touch when any one of the levels of the at least two selected signals is less than the reference levels. However, various modifications may be made, such as a case in which it is determined that the plurality of signals generated in S600 are generated by the effective touch, when at least four signals are selected to increase the accuracy of noise detection and levels of at least two signals among the four signals are less than the reference levels.

As set forth above, in a touch sensing apparatus according to embodiments of the present invention, signals detected from at least two electrodes spaced apart from one another by a predetermined distance or greater from among a plurality of electrodes may be compared with predetermined reference levels, and the influence of noise may be determined from the comparison result. Accordingly, the influence of noise generated in other electronic components (an RF module, a display device, an audio/video driving circuit, an antenna unit, and the like) adjacently disposed to the touch sensing apparatus may be minimized without the addition of a separate shielding layer or a complex circuit and algorithm, and an effective touch may be accurately sensed.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus, comprising:
   a sensing circuit unit detecting a plurality of signals from a plurality of changes in capacitance generated in a plurality of electrodes provided in a panel unit; and
   a signal processing unit comparing, with predetermined reference levels, levels of at least two signals generated from changes in capacitance in at least two electrodes selected from among the plurality of electrodes provided in the panel unit to be spaced apart from one another by a predetermined distance or greater,
   wherein, when the levels of the at least two signals from the at least two electrodes selected to be spaced part from one another by the predetermined distance or greater are greater than the predetermined reference levels, the plurality of changes in capacitance are determined to be generated due to noise.

2. The touch sensing apparatus of claim 1, wherein the sensing circuit unit includes a plurality of capacitance sensing circuits integrating the plurality of changes in capacitance to generate the plurality of signals.

3. The touch sensing apparatus of claim 2, further comprising a controlling unit adjusting a timing at which the capacitance sensing circuits initiate integration of the plurality of changes in capacitance when the plurality of changes in capacitance are determined to be generated due to the noise.

4. The touch sensing apparatus of claim 3, wherein the controlling unit causes the integration of the capacitance sensing circuits to be stopped for a predetermined period of time when the plurality of changes in capacitance are determined to be generated due to the noise.

5. The touch sensing apparatus of claim 4, wherein the controlling unit causes the capacitance sensing circuits to be operated in synchronization with a driving timing at which a driving signal is applied to at least a portion of the plurality of electrodes when the predetermined period of time has elapsed.

6. The touch sensing apparatus of claim 1, wherein the signal processing unit includes:
   at least two comparing circuits comparing the levels of the at least two signals with the predetermined reference levels; and
   a calculating unit determining whether the plurality of changes in capacitance are generated due to the noise using a comparison result of the at least two comparing circuits.

7. The touch sensing apparatus of claim 6, wherein the calculating unit includes at least one logic circuit.

8. The touch sensing apparatus of claim 1, wherein the at least two electrodes include two electrodes, from among the plurality of electrodes provided in the panel unit, spaced apart from one another by a maximal distance.

9. A touch sensing method, comprising:
   selecting at least two signals detected from at least two electrodes selected from among a plurality of electrodes provided in a panel unit to be spaced apart from one another by a predetermined distance or greater, from among a plurality of signals detected from the plurality of electrodes;
   comparing levels of the at least two signals with a predetermined reference level; and
   determining that the plurality of signals are generated due to noise, when the levels of the at least two signals from the at least two electrodes selected to be spaced part from one another by the predetermined distance or greater are greater than the predetermined reference level.

10. The touch sensing method of claim 9, further comprising integrating changes in capacitance generated in the plurality of electrodes to generate the plurality of signals.

11. The touch sensing method of claim 10, further comprising stopping generating the plurality of signals for a predetermined period of time when the plurality of signals are determined to be generated due to the noise.

12. The touch sensing method of claim 11, further comprising restarting the integrating of the changes in capacitance generated in the plurality of electrodes in synchronization with a driving timing at which a driving signal is applied to at least a portion of the plurality of electrodes, when the predetermined period of time has elapsed.

13. The touch sensing method of claim 9, wherein the selecting of the at least two signals is performed on the at least two electrodes including two electrodes, from among the plurality of electrodes, spaced apart from one another by a maximal distance.

14. The touch sensing method of claim 9, wherein the predetermined reference level includes a plurality of reference levels having different signs.

15. The touch sensing method of claim 14, wherein the levels of the at least two signals are compared with the plurality of reference levels.

\* \* \* \* \*